Patented Feb. 25, 1936

2,032,097

UNITED STATES PATENT OFFICE 2,032,097

WATERPROOFING LEATHER

Henry Alfred Piggott and George Stuart James White, Blackley, Manchester, England, assignors to Imperial Chemical Industries Limited, Westminster, England No Drawing. Application May 8, 1934, Serial No. 724,630. In Great Britain May 13, 1933

5 Claims. (Cl. 149—6)

This invention relates to waterproofing leather.

According to the invention we treat a leather with an aqueous solution of a salt chosen from the group consisting of quaternary ammonium, quaternary phosphonium and sulphonium salts containing an aliphatic chain of not less than 10 carbon atoms.

Examples of suitable quaternary ammonium salts are:—dodecyltrimethylammonium chloride (from dodecyl chloride and trimethylamine) cetyltrimethylammonium chloride, octadecylpyridinium iodide (see B. P. 379,396) stearylpyridinium bromide (see B. P. 379,396), stearamidophenyltrimethylammonium methyl sulphate (made by condensing asymmetrical dimethyl-p-phenylenediamine with stearoyl chloride and then treating the condensation product with dimethyl sulphate), and methylcetylpiperidinium methyl sulphate (made by interacting 2 molecules of piperidine with 1 molecule of cetyl bromide, separating the cetylpiperidine and treating with dimethyl sulphate).

Examples of suitable quaternary phosphonium salts are cetyltrimethylphosphonium bromide (made by interacting trimethylphosphine and cetyl bromide), and dodecyltrimethylphosphonium bromide (similarly made from dodecyl bromide and trimethylphosphine).

Examples of suitable sulphonium salts are cetyldimethylsulphonium methyl sulphate (made by heating cetylmethyl sulphide with dimethyl sulphate; cetylmethyl sulphide is itself made by interacting equivalent quantities of cetyl mercaptan and dimethyl sulphate), benzylcetylmethylsulphonium methyl sulphate, dodecyldimethylsulphonium bromide (made by heating dodecylmethyl sulphide with methyl bromide until a completely water-soluble product is obtained; dodecylmethylsulphide is itself made by interacting equivalent quantities of dodecyl mercaptan and dimethyl sulphate in aqueous alkaline medium.

In carrying the invention into practical effect the leather, which may have been previously dyed or stained, for instance, with an acid or a direct cotton dyestuff, is treated by brushing, padding or spraying with an aqueous solution, which may be cold or warm, of the salt. The leather is then allowed to dry in the usual manner.

If desired the dried surface may be treated mechanically to increase its lustre by brushing, plush-wheeling, plating or glazing.

Working according to our invention, the resistance of the leather to water is increased. Not only does the leather surface wet or take up water much less readily, but when the surface is colored, the fastness of the color to water is in most cases also increased; thus with acid and direct colours the marking or spotting which usually shows after wetting is avoided.

The invention is illustrated, but not limited, by the following examples, parts being by weight.

Example 1.—Furniture leathers are brush-stained with two coats of a 1% solution of Lissamine Green SFS (Colour Index No. 670), drying between each application. A 1% solution of cetylpyridinium bromide is then applied by brush and the leather dried again.

Example 2.—100 lbs. of vegetable-tanned calfskin is dyed with 4 lbs. of a mixture of Acid Orange GS (Colour Index No. 27), Naphthalene Red JS (Colour Index No. 176) and Naphthalene Black 12BS (Colour Index No. 246). The leather is dried and then a 1% solution of trimethylcetylammonium chloride applied by means of a pad. The leather is dried again. A superior fastness to water and spotting is obtained.

Example 3.—100 lbs. vegetable-tanned sheepskins are dyed with 5 lbs. Crocein Scarlet 3BDS (Colour Index No. 252), then dried and aftertreated with p-stearamidophenyltrimethylammonium methyl sulphate. Superior water fastness with a brightening of shade of the dyed leather is obtained.

Example 4.—A solution of 1 part of cetylbenzylmethylsulphonium methyl sulphate in 80 parts of water is brushed on to the grain side of upholstery hide, and then dried. The so-treated leather has better resistance to water.

We claim:

1. A process of waterproofing vegetable tanned leather which comprises superficially applying an aqueous solution of a salt chosen from the group consisting of quaternary ammonium salts, quaternary phosphonium salts, and sulphonium salts containing an aliphatic chain of not less than ten carbon atoms to a surface of said leather.

2. A process according to claim 1 wherein the leather being treated has previously been dyed or stained.

3. A process as claimed in claim 1 in which the salt is a cetyltrimethylammonium halide.

4. A process as claimed in claim 1 in which the salt is a cetylpyridinium halide.

5. A process of treating vegetable tanned leather which comprises dyeing said leather with an acid or a direct cotton dyestuff and then superficially applying an aqueous solution of a salt chosen from the group consisting of quaternary ammonium salts, quaternary phosphonium salts, and sulphonium salts containing an aliphatic chain of not less than ten carbon atoms to a surface of said leather in order to increase the water fastness of said dyestuff.

HENRY ALFRED PIGGOTT.
GEORGE STUART JAMES WHITE.